(No Model.)
T. MAXON.
DRIVE CHAIN.
No. 420,818. Patented Feb. 4, 1890.
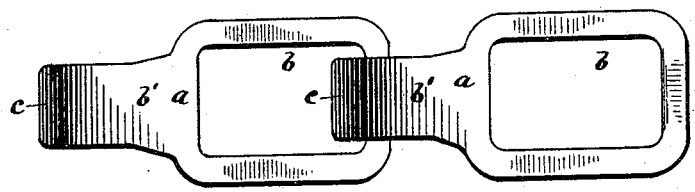
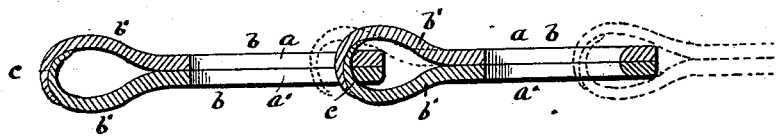
WITNESSES
Chas. W. Conboye.
C. D. Davis
INVENTOR
Thomas Maxon
By C. M. Alexander
Attorney

UNITED STATES PATENT OFFICE.

THOMAS MAXON, OF DAYTON, OHIO, ASSIGNOR OF ONE-HALF TO CASPER FENZEL, OF SAME PLACE.

DRIVE-CHAIN.

SPECIFICATION forming part of Letters Patent No. 420,818, dated February 4, 1890.

Application filed November 8, 1889. Serial No. 329,626. (No model.)

*To all whom it may concern:*

Be it known that I, THOMAS MAXON, a citizen of the United States, residing at Dayton, in the county of Montgomery and State of Ohio, have invented certain new and useful Improvements in Drive-Chains, of which the following is a specification, reference being had therein to the accompanying drawings, in which—

Figure 1 represents a plan view of a portion of the improved chain, and Fig. 2 a longitudinal sectional view of the same.

The invention has particular reference to that class of drive and other chains constructed of separable metallic links pivotally connected together and adapted to run on sprocket-wheels, as will be more fully hereinafter set forth.

The essential objects of this invention are to produce a chain of the above character which shall be very strong and extremely simple in construction and adapted to be readily shortened by the removal of any number of links or lengthened by the insertion of new links, as the exigencies of the case may require, without the employment of independent pivotal pins, screws, or rivets, the links of the chain being held together by simply keeping the chain taut, as will presently appear.

Each link is composed of two sections, the upper section being lettered $a$ and the lower one $a'$, each section being formed in one piece, either cast or cut or stamped from sheet metal. Each section consists of a rectangular or other shaped frame $b$, provided with a tongue $b'$, projecting from its rear end, these tongues being formed into hooks $c$ at their ends, the hook on the upper section being somewhat larger than the hook on the lower section.

When in position, the frames $b$ of the links lie close together, and the lower hooks fit snugly within and are embraced by the upper larger hooks, as shown, each pair of hooks in the chain forming an eye or loop for the forward bars of the adjacent link to work in, the bars (which form the pivotal points in the chain) bearing against the interior of the smaller hooks. As thus constructed, it will be observed, the tension of the chain will be sufficient to prevent the links separating.

When it is desired to remove any of the links or insert more, the chain may be separated at any point by first loosening it a little and then sliding the upper section of one of the links back far enough to disengage its hook from its lower section, the eyes formed by the hooks being sufficiently elongated to permit this to be done.

Having thus fully described my invention, what I claim, and desire to secure by Letters Patent, is—

A drive-chain consisting of separable links, each of which is constructed of two loosely-superimposed frames, each frame being provided with a hook, the hook of one frame being larger than its adjacent hook and adapted to partly surround and embrace it, as shown, whereby the parts of the chain will be held together by keeping the chain taut, substantially as herein described.

In testimony whereof I affix my signature in presence of two witnesses.

THOMAS MAXON.

Witnesses:
HORACE M. FRANK,
JOHN L. H. FRANK.